United States Patent
Lim

(10) Patent No.: US 8,391,917 B2
(45) Date of Patent: Mar. 5, 2013

(54) DUAL STANDBY MOBILE COMMUNICATION TERMINAL AND SYSTEM ACCESS METHOD FOR THE SAME

(75) Inventor: Nam Kyu Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1097 days.

(21) Appl. No.: 11/705,804

(22) Filed: Feb. 13, 2007

(65) Prior Publication Data

US 2008/0051132 A1 Feb. 28, 2008

(30) Foreign Application Priority Data

Aug. 29, 2006 (KR) .................. 10-2006-0082151

(51) Int. Cl.
*H04W 74/00* (2009.01)
(52) U.S. Cl. .................................. 455/552.1; 455/525
(58) Field of Classification Search ............... 455/552.1, 455/553.1, 525
See application file for complete search history.

(56) References Cited

U.S. PATENT DOCUMENTS

| | | | |
|---|---|---|---|
| 5,978,679 A | 11/1999 | Agre | |
| 6,603,755 B1 | 8/2003 | Parker | |
| 7,493,118 B2 * | 2/2009 | Su | 455/435.1 |
| 2005/0181822 A1 * | 8/2005 | Sasaki et al. | 455/552.1 |
| 2005/0277436 A1 * | 12/2005 | Lai et al. | 455/552.1 |
| 2006/0105812 A1 | 5/2006 | Shin | |
| 2006/0135083 A1 * | 6/2006 | Leinonen et al. | 455/78 |
| 2006/0223575 A1 * | 10/2006 | Su | 455/552.1 |
| 2007/0010285 A1 * | 1/2007 | Schmidt | 455/553.1 |
| 2007/0032220 A1 * | 2/2007 | Feher | 455/404.1 |
| 2007/0293263 A1 * | 12/2007 | Eslambolchi et al. | 455/552.1 |
| 2008/0090605 A1 * | 4/2008 | Park et al. | 455/552.1 |
| 2008/0119183 A1 * | 5/2008 | Kono | 455/432.1 |
| 2008/0167069 A1 * | 7/2008 | Bridgelall | 455/553.1 |
| 2008/0261648 A1 * | 10/2008 | Tomizu | 455/552.1 |
| 2009/0117937 A1 * | 5/2009 | Ewert et al. | 455/552.1 |
| 2009/0191864 A1 * | 7/2009 | Mousseau et al. | 455/426.1 |

FOREIGN PATENT DOCUMENTS

| | | |
|---|---|---|
| CN | 1360808 | 7/2002 |
| KR | 1020050032142 | 4/2005 |
| KR | 1020050082821 | 8/2005 |
| KR | 100576523 | 4/2006 |
| KR | 1020060054562 | 5/2006 |
| KR | 1020060073200 | 6/2006 |

* cited by examiner

Primary Examiner — Kamran Afshar
Assistant Examiner — Khawar Iqbal
(74) Attorney, Agent, or Firm — The Farrell Law Firm, P.C.

(57) ABSTRACT

Disclosed is a mobile communication terminal and system access method for supporting a dual-standby mode, that can access at least two radio communication systems for receiving a system access request signal and attempting, when the system access request signal is received, to access a system of a preset system preference mode.

10 Claims, 1 Drawing Sheet

DUAL STANDBY MOBILE COMMUNICATION TERMINAL AND SYSTEM ACCESS METHOD FOR THE SAME

CLAIMS OF PRIORITY

This application claims priority to an application entitled "DUAL STANDBY MOBILE COMMUNICATION TERMINAL AND SYSTEM ACCESS METHOD FOR THE SAME" filed in the Korean Intellectual Property Office on Aug. 29, 2006 and assigned Serial No. 2006-82151, the contents of which are incorporated herein by reference.

BACKGROUND OF THE INVENTION

1. Field of the Invention

The present invention relates to a mobile communication terminal, and, more particularly, to a mobile communication terminal and system access method that support a dual-standby mode.

2. Description of the Related Art

As mobile terminals have been more widely used, terminals for providing various functions have been developed. Recently, dual-mode mobile terminals that can use two or more radio communication networks have been launched.

In the related art, a terminal supporting one radio communication system can communicate in only a service area of the corresponding radio communication system. However, a dual-mode mobile terminal, for example, a dual-mode mobile terminal that supports a Code Division Multiple Access (CDMA) system and a Global System for Mobile communications (GSM), can communicate, in this example, in both a CDMA service area and a GSM service area.

However, in a conventional dual-mode mobile terminal, because system mode conversion is performed through a menu manipulation in an idle mode, the manipulation is complicated and much time is required for mode conversion.

In order to solve this problem, a dual-standby terminal has been suggested that simultaneously supports two modes of GSM and CDMA, unlike the dual-mode terminal.

In the dual-standby terminal, the terminal can receive a call by automatically converting a mode regardless of a user's intention when the terminal receives a call, however, to perform a system access process such as sending of a call, a specific mode among two modes must be selected. Presently available dual-standby terminals lack an efficient mechanism for mode conversion and no such mechanism has been suggested.

SUMMARY OF THE INVENTION

The present invention has been made in an effort to solve the above problems, and an object of the present invention is to provide a dual-standby mobile communication terminal and system access method that can enhance convenience in a user's system selection by setting a preference system in a service condition or current environment that the user uses.

In accordance with an aspect of the present invention, the above and other objects are accomplished by a system access method of a multi-mode multi-standby terminal that can access at least two radio communication systems. The system access method includes receiving a system access request signal and attempting, when the system access request signal is received, to access a system of a preset system preference mode.

Preferably, attempting to access a system includes determining whether the preset system preference mode is a normal mode; outputting, if the preset system preference mode is a normal mode, a system selection request message; receiving a system selection signal in response to the system selection request message; and attempting to access a system selected according to the system selection signal.

Preferably, attempting to access a system further includes determining, if the preset system preference mode is not a normal mode, whether the set system mode is a first system preference mode; and attempting, if the set system mode is a first system preference mode, to access a first system.

Preferably, attempting to access a system further includes attempting, if the set system mode is not a first system preference mode, to access a second system.

Preferably, the first system is a Global System for Mobile Communications (GSM) and the second system is a Code Division Multiple Access (CDMA) system.

In accordance with another aspect of the present invention, the above and other objects are accomplished by a system access method of a dual-standby terminal for supporting GSM and CDMA. The system access method includes receiving a system access request signal; detecting, when the system access request signal is received, a system preference mode set in the terminal; and attempting to access the system according to the detected system preference mode.

Preferably, the system preference mode includes a normal mode that selects a system to attempt the access by a user's input; a GSM system preference mode that automatically accesses the GSM system when the system access request signal is received; a CDMA system preference mode that automatically accesses the CDMA system when the system access request signal is received; or a simultaneous access mode that simultaneously accesses both the GSM system and the CDMA system when the system access request signal is received.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Preferred embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

While the present invention may be embodied in many different forms, specific embodiments of the present invention are shown in drawings and are described herein in detail, with the understanding that the present disclosure is to be considered as an exemplification of the principles of the invention and is not intended to limit the invention to the specific embodiments illustrated.

Figure 1:
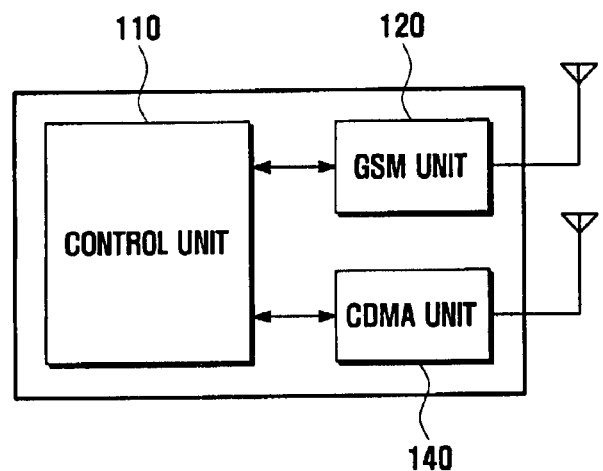
FIG. 1 is a block diagram schematically illustrating a dual-mode dual-standby terminal according to the present invention.

FIG. 1 is a block diagram schematically illustrating a dual-mode dual-standby terminal according to the present invention. Referring to FIG. 1, the dual-mode dual-standby terminal includes a GSM unit 120 and a CDMA unit 140. The GSM unit 120 and the CDMA unit 140 are provided with a GSM interface and a CDMA interface, respectively, so that the dual-mode dual-standby terminal may communicate through each of a GSM network and a CDMA network under the control of a control unit 110.

The dual-mode dual-standby terminal enters a dual-standby mode by simultaneously activating the GSM unit 120 and the CDMA unit 140 when the terminal is turned on. Accordingly, the dual-mode dual-standby terminal can process a call received through the GSM network or the CDMA network.

Further, the dual-mode dual-standby terminal can send a call through the GSM unit 120 or the CDMA unit 140 according to the preset system preference mode, thereby communicating through the corresponding GSM or CDMA network.

In the present invention, a GSM/CDMA dual-mode dual-standby terminal that supports two radio communication systems, for example, a CDMA system and a GSM system, is illustrated, but the present invention is not limited to the GSM/CDMA dual-mode terminal and can be applied to a multi-mode terminal to support any number of radio communication systems being serviced at present or to be serviced in the future.

Preferably the present invention provides three system preference modes that a user can select. A first system preference mode is a normal mode that selects a mode, either GSM or CDMA, as available, when the user attempts to access a system. A second system preference mode is a GSM system preference mode that automatically accesses the GSM system when the user attempts to access a system. A third system preference mode is a CDMA system preference mode that automatically accesses the CDMA system when the user attempts to access a system.

Where the GSM/CDMA dual-standby terminal is set to a normal mode means a state where a user does not set the terminal to a specific preference system mode. If the user attempts to access the system to send a call, the terminal asks the user through a pop-up message whether the terminal should attempt to access the GSM system or the CDMA system and attempts to access the selected system according to the user's key input signal in response to the inquiry.

When the GSM/CDMA dual-standby terminal is set to a GSM system preference mode, if a user attempts to access the system, the terminal directly attempts to access the GSM system without inquiring whether to access the GSM system or the CDMA system.

When the GSM/CDMA dual-standby terminal is set to a CDMA system preference mode, if a user attempts to access the system, the terminal directly attempts to access the CDMA system without inquiring whether to access the GSM system or the CDMA system.

Figure 2:
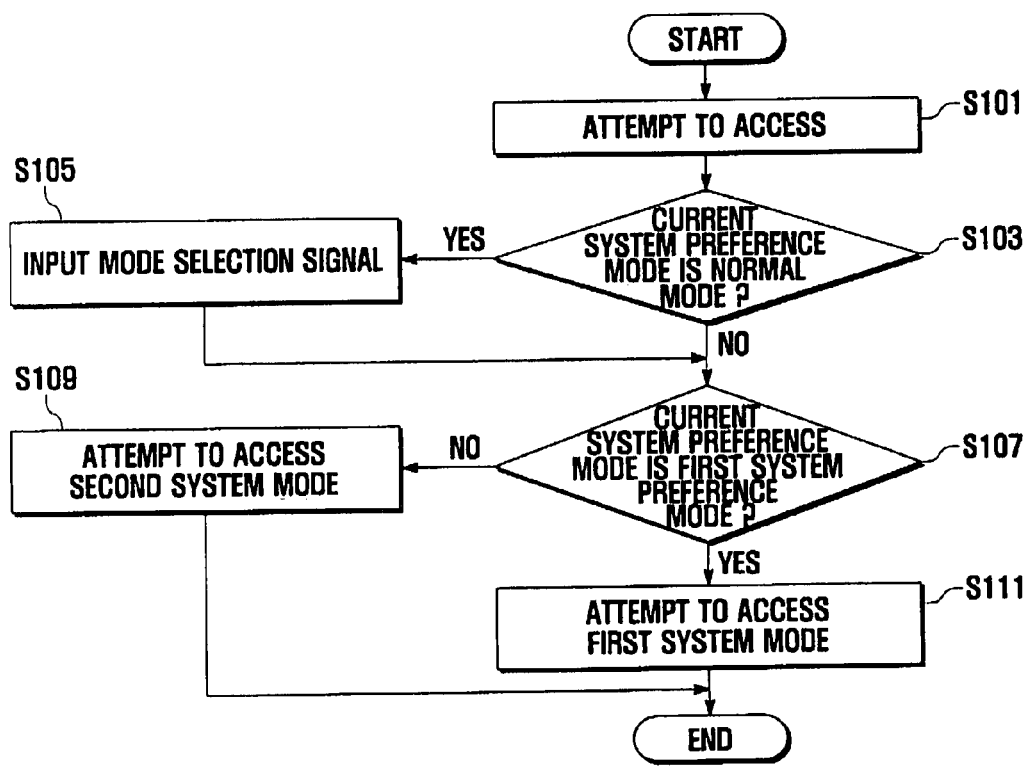
FIG. 2 is a flowchart illustrating a system access method of a dual-mode dual-standby terminal according to the present invention.

FIG. 2 is a flowchart illustrating a system access method of a dual-mode dual-standby terminal according to the present invention. Referring to FIG. 2, when a user attempts to access a network system Step S101, the terminal determines whether a current system preference mode is a normal mode in Step S103. If a current system preference mode is not a normal mode, the terminal determines whether the current system preference mode is a first system preference mode in Step S107.

If the current system preference mode is a first system preference mode, the terminal attempts to access a first system in Step S111. If the current system preference mode is not a first system preference mode, the terminal attempts to access a second system in Step S109.

If a current set system preference mode is a normal mode in Step S103, the terminal outputs a message to inquire whether to access the first system or the second system, receives a mode selection signal from the user in Step S105, and performs Step S107 according to the received signal.

In the present embodiment, the first system is a GSM system and the second system is a CDMA system.

According to the setting of the user, if the terminal fails to access a preferred system, the terminal reattempts to access the corresponding system a preset number of times. If the terminal fails to access the preferred system even after reattempting to access the corresponding system the preset number of times, the terminal may be set to attempt to access the other system.

For example, when a system preference mode of the terminal is set to a GSM system preference mode, the terminal attempts to access the GSM system. If the terminal fails to access the GSM system, the terminal attempts to access the GSM system the preset number of times. If the terminal fails to access the GSM system even after reattempting to access the GSM system the preset number of times, the terminal may be set to attempt to automatically access the CDMA system.

Further, instead of automatically accessing the other system after the terminal fails to access a specific system the preset number of times, the terminal may be set to output a guide message to guide a user's subsequent manipulation.

Further, the terminal, e.g. the GSM/CDMA dual-standby terminal, may be set to simultaneously access the two systems.

As described above, in a system access method of a dual-standby terminal of the present invention, when a preferred system is preset according to a service condition and radio environment of each system, the terminal attempts automatically to first access a preferred system according to a user's selection when the terminal accesses the system, thereby enhancing a user's convenience.

Although exemplary embodiments of the present invention have been described in detail hereinabove, it should be clearly understood that many variations and modifications of the basic inventive concepts herein taught as understood by those skilled in the art will still fall within the spirit and scope of the present invention, as defined in the appended claims.

What is claimed is:

1. A system access method of a multi-mode multi-standby terminal that can access at least two radio communication systems comprising:
   receiving, in a state where the multi-mode multi standby terminal is set to a preset system preference mode, a system access request signal corresponding to a request for initiating a call;
   detecting, upon receiving the system access request signal, the preset system preference mode;
   attempting to access a radio communication system according to the detected system preference mode;
   determining whether the multi-mode multi-standby terminal fails to access the radio communication system after a preset number of attempts; and
   outputting, if the multi-mode multi-standby terminal fails to access the radio communication system after the preset number of attempts, a guide message for guiding a subsequent input of the user,
   wherein attempting to access the radio communication system comprises:
   determining whether the preset system preference mode is a normal mode;
   outputting, if the preset system preference mode is the normal mode, a system selection request message;

receiving a system selection signal in response to the system selection request message; and attempting to access a selected system according to the system selection signal.

2. The system access method of claim 1, further comprising:

determining, if the preset system preference mode is not the normal mode, whether the set system preference mode is a first system preference mode; and attempting, if the set system preference mode is a first system preference mode, to access a first system.

3. The system access method of claim 2, further comprising:

attempting, if the set system preference mode is not the first system preference mode, to access a second system.

4. The system access method of claim 3, wherein the second system is a Code Division Multiple Access (CDMA) system.

5. The system access method of claim 2, wherein the first system is a Global System for Mobile communications (GSM) system.

6. A system access method of a dual-standby terminal supporting Global System for Mobile communications (GSM) and Code Division Multiple Access (CDMA) radio communications systems comprising:

receiving, in a state where the dual-standby terminal is set to a preset system preference mode, a system access request signal corresponding to a user system access request for initiating a call;

detecting, upon receiving the system access request signal, the preset system preference mode;

attempting to access a radio communications system according to the detected system preference mode;

determining whether the dual-standby terminal fails to access the radio communication system after a preset number of attempts; and outputting, if the dual-standby terminal fails to access the radio communication system after the preset number of attempts, a guide message for guiding a subsequent input of the user, wherein attempting to access the radio communications system comprises:

determining whether the preset system preference mode is a normal mode:

outputting, if the preset system preference mode is the normal mode, a system selection request message;

receiving a system selection signal in response to the system selection request message; and attempting to access a selected system according to the system selection signal.

7. The system access method of claim 6, wherein when the system preference mode is a GSM system preference mode, attempting to access the radio communications system comprises:

automatically accessing a GSM radio communications system when the system access request signal is received.

8. The system access method of claim 6, wherein when the system preference mode is a CDMA system preference mode, attempting to access the radio communications system comprises:

automatically accessing a CDMA radio communications system when the system access request signal is received.

9. The system access method of claim 6, wherein the system preference mode is a simultaneous access mode, attempting to access the radio communications system comprises:

simultaneously accessing both a GSM and a CDMA radio communications system when the system access request signal is received.

10. A dual-standby terminal supporting Global System for Mobile communications (GSM) and Code Division Multiple Access (CDMA) comprising:

an access request unit for receiving, in s state where the dual-standby terminal is set to a preset system preference mode, a system access request signal corresponding to a request for initiating a call;

a detection unit for detecting, upon the receipt of the system access request signal by the access request unit, the preset system preference mode; and a preference system access attempting unit for attempting to access a radio communications system according to the system preference mode detected in the detection unit, wherein the dual-standby terminal determines whether the dual-standby terminal fails to access the radio communication system after a preset number of attempts, and if the dual-standby terminal fails to access the radio communication system after the preset number of attempts, the dual-standby terminal outputs a guide message for guiding a subsequent input of the user, and wherein the preference system determines whether the preset system preference mode is a normal mode, outputs, if the preset system preference mode is the normal mode, a system selection request message, receives a system selection signal in response to the system selection request message, and attempts to access a selected system according to the system selection signal.

* * * * *